United States Patent [19]
Crandall

[11] Patent Number: 5,926,331
[45] Date of Patent: Jul. 20, 1999

[54] POWER PACK FOR CONTROLLING THE ANGULAR POSITION OF A VEHICLE REARVIEW MIRROR

[75] Inventor: Robert M. Crandall, Capac, Mich.

[73] Assignee: Harman Automotive, Inc., Farmington Hills, Mich.

[21] Appl. No.: 08/791,360

[22] Filed: Jan. 30, 1997

[51] Int. Cl.[6] .................................. G02B 7/18; B60R 1/06
[52] U.S. Cl. .................... 359/877; 359/872; 359/875; 359/876; 248/476; 248/479; 248/485; 248/487
[58] Field of Search ........................ 359/877, 872, 359/875, 876; 248/476, 479, 481, 485, 487

[56] References Cited

U.S. PATENT DOCUMENTS

| | | | |
|---|---|---|---|
| 3,838,608 | 10/1974 | Hadley | 74/501 M |
| 3,917,212 | 11/1975 | Hadley et al. | 248/487 |
| 3,918,319 | 11/1975 | Mills | 74/491 |
| 3,966,162 | 6/1976 | Hadley | 248/487 |
| 4,158,483 | 6/1979 | Fisher et al. | 359/876 |
| 4,182,182 | 1/1980 | Stortz | 73/343 R |
| 4,315,113 | 2/1982 | Fisher et al. | 200/5 R |
| 4,356,357 | 10/1982 | Fisher | 200/5 R |
| 4,401,289 | 8/1983 | Fisher et al. | 248/483 |
| 4,628,760 | 12/1986 | Huddleston | 74/501 R |
| 4,824,232 | 4/1989 | Thompson | 359/877 |
| 4,830,327 | 5/1989 | Fimeri | 248/481 |
| 4,836,491 | 6/1989 | Fimeri | 248/549 |
| 4,856,885 | 8/1989 | Fimeri | 359/874 |
| 4,867,409 | 9/1989 | Fimeri | 248/549 |
| 4,881,418 | 11/1989 | Fimeri | 74/89.19 |
| 4,904,074 | 2/1990 | Gilbert | 359/875 |
| 4,919,525 | 4/1990 | Gilbert | 52/736.1 |
| 4,922,382 | 5/1990 | Hobbins | 361/424 |
| 5,205,182 | 4/1993 | Gilbert | 359/841 |
| 5,268,796 | 12/1993 | Tomerlin et al. | 359/877 |
| 5,331,471 | 7/1994 | Gilbert | 359/874 |
| 5,701,211 | 12/1997 | Perry et al. | 359/877 |

FOREIGN PATENT DOCUMENTS

| | | | |
|---|---|---|---|
| 0614783 | 9/1994 | European Pat. Off. | 359/877 |
| 0084641 | 5/1984 | Japan | 359/877 |

*Primary Examiner*—Cassandra Spyrou
*Assistant Examiner*—Mohammad Y. Sikder
*Attorney, Agent, or Firm*—Dykema Gossett PLLC

[57] ABSTRACT

A power pack for controlling the position of a rearview mirror of an automotive vehicle which is to be mounted within a mirror housing. The mirror housing is shaped to define a cavity. The power pack is connected to a base plate which holds the mirror within the housing cavity. A stationary pivot assembly is connected to the power pack to pivotally couple to the base plate. A movable pivot assembly is connected to the base plate for pivoting the mirror about the stationary pivot assembly. A motor is located within the power pack and is rotatably coupled to a drive shaft. A first portion of the drive shaft has a first set of threads and a second portion of the drive shaft has a second set of threads opposite that of the first portion. A first arm and second arm are coupled to said first set of threads and the said second set of threads, respectively. Each arm is also connected to the moveable pivot assembly. As the first arm and second arm travel along the shaft, the moveable pivot assembly moves with respect to the power pack. The movement provided by the moveable pivot assembly rotates the mirror about the stationary pivot assembly.

17 Claims, 3 Drawing Sheets

POWER PACK FOR CONTROLLING THE ANGULAR POSITION OF A VEHICLE REARVIEW MIRROR

BACKGROUND OF THE INVENTION

The present invention relates generally to exterior rearview mirrors for automotive vehicles and, more specifically, to a power pack connected within a mirror for remotely controlling the movement of the mirror.

Early automotive vehicles commonly used manual adjustments for adjusting the outside rear view mirrors. That is, the vehicle operator would roll down the window and adjust the mirror by hand. Later improvements to adjusting the mirror included a mechanical system controlled from within the vehicle in which a series of control wires were connected to the mirror. As a control lever inside the vehicle was moved the control wires moved the mirror within the mirror housing.

Further improvements of mirror adjustments include electrically operating the movement mechanism so that a vehicle operator may adjust an electrical switch within the vehicle which is connected to a motorized unit within the mirror housing. The motorized unit is commonly called a power pack. Many configurations for power packs are known. Due to various factors, movement of a mirror using the power pack can generate a considerable amount of noise. Noise is generated from the movement mechanisms such as gears within the power pack which cause the mirror to move. Typically, the noise generated is very undesirable. Thus, it would be preferable to eliminate such undesirable noise.

Another disadvantage of prior art mirror configurations is that the movement of the mirror with respect to the housing is choppy. That is, movement of the mirror comes in short spurts rather than in a smooth fluid-like motion. Providing smooth mirror operation is desirable.

Accordingly, it would be desirable to provide a mirror assembly having reduced operating noise while providing smooth operation.

SUMMARY OF THE INVENTION

The present invention includes a power pack which is to be mounted within a mirror housing. The mirror housing is shaped to define a cavity. The power pack is connected to a base plate which holds the mirror within the housing cavity. A stationary pivot assembly is connected to the power pack to pivotally couple it to the base plate. A movable pivot assembly is connected to the base plate for pivoting the mirror about the stationary pivot assembly.

A motor is located within the power pack and is rotatably coupled to a drive shaft. A first portion of the drive shaft has a first set of threads and a second portion of the drive shaft has a second set of threads opposite that of the first portion. A first arm and second arm are coupled to the first set of threads and the second set of threads, respectively. Each arm is also connected to the moveable pivot assembly. As the first arm and second arm travel along the shaft, the moveable pivot assembly moves with respect to the power pack. The movement provided by the moveable pivot assembly rotates the mirror about the stationary pivot assembly.

In one embodiment of the invention, a second moveable pivot assembly is also mounted within the power pack to provide a full range of movement to the mirror. For smaller mirrors two adjusters may be mounted in a single power pack. For larger mirrors, such as in a heavy truck application, first and second pivot assemblies may be separate.

One advantage of the present invention is that an improved movement quality and an improved sound quality has been accomplished. Three gears have been used for connecting the drive shaft to the output shaft of the motor to reduce load on the motor. Also any parting lines from forming of the gears are removed prior to assembly. Each of these reduces the noise from the power pack.

Another advantage of the present invention is that the first arm and the second arm do not have to be centered on the shaft when assembled. Because the arms are preferably coupled to the shaft by a ratchet, after one full cycle of motion, if the arms are not centered the ratchet movement allows slippage between the shaft and ratchet to allow the arms to become centered on the shaft.

BRIEF DESCRIPTION OF THE DRAWINGS

Other features and advantages of the present invention will become apparent from the following detailed description which should be read in conjunction with the drawings in which.

DETAILED DESCRIPTION OF A PREFERRED EMBODIMENT

Figure 1:
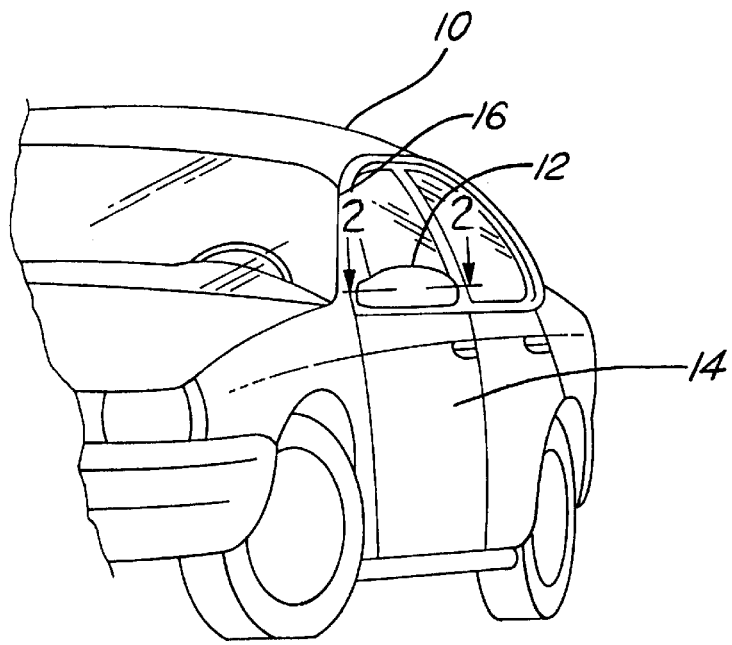
FIG. 1 is a fragmentary perspective view of an automotive vehicle having a mirror assembly according to the present invention.

Referring now to the drawings, like reference numerals are used to identify identical components in the various views. Although the invention will be illustrated in the context of a driver side door, it will be appreciated that this invention will be used with other applications requiring a mirror.

Referring now to FIG. 1, an automotive vehicle 10 is shown having a mirror assembly 12 mounted on a vehicle door 14. The terms interior, exterior, rearward, and forward, as used in this description, are related to the mirror assembly as installed on automotive vehicle 10. Mirror assemblies are most commonly mounted on vehicle door 14. Mirror assembly 12 may, however, be mounted to another portion of automotive vehicle 10 such as an A-Pillar 16. Mirror assembly 12 may be mounted in a conventional manner so that it remains ridgedly affixed to the door during operation. Mirror assembly 12 may also be mounted in a breakaway or power fold type assembly. One example of a breakaway mirror assembly is found in a co-pending and commonly assigned application entitled "BREAKAWAY MIRROR CONSTRUCTION AND METHOD OF ASSEMBLY" [attorney docket number 64456-006] which is incorporated herein by reference.

Figure 2:
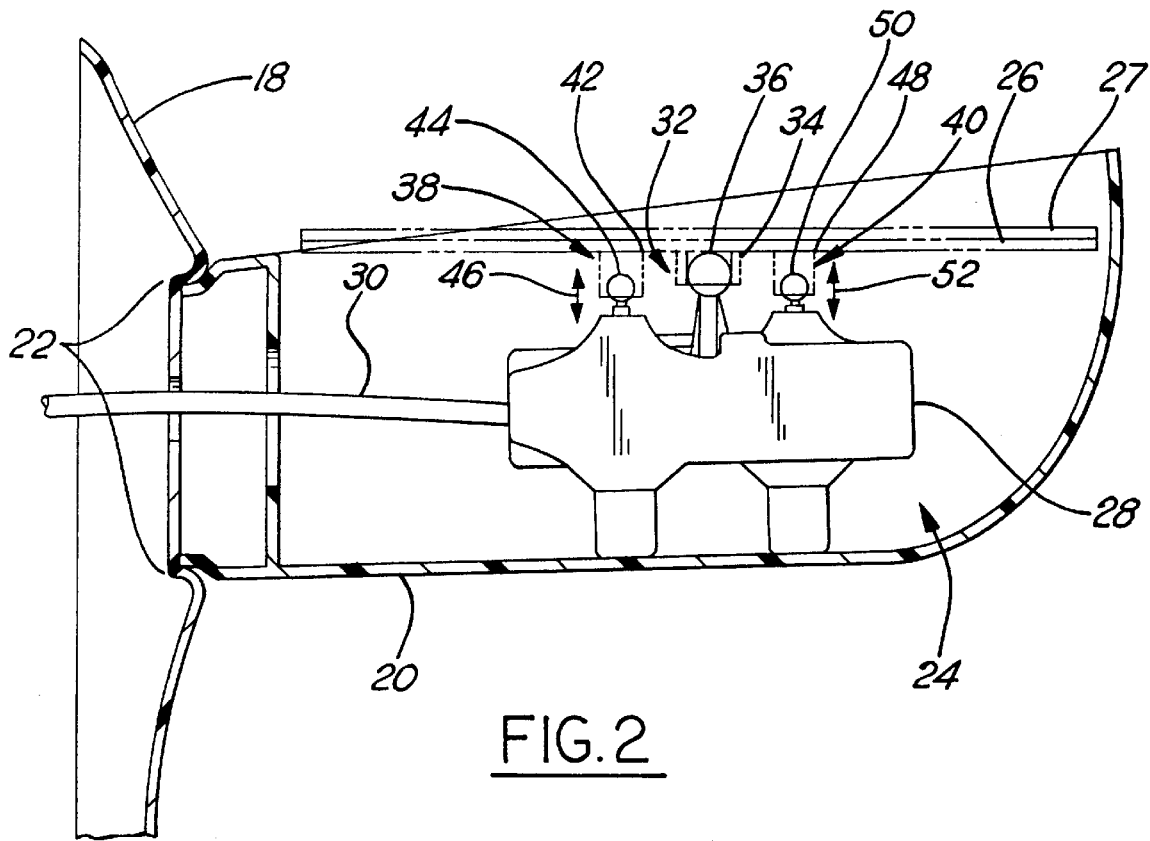
FIG. 2 is a cross-sectional view of a mirror assembly along line 2—2 of FIG. 1.

Referring now to FIG. 2, the mirror assembly may generally comprise two distinct components if used in a breakaway or power fold mirror assembly, an applique 18 and a mirror housing 20. Applique 18 is fixedly mounted to vehicle door 14 through use of mounting bolts (not shown). Applique 18 has a receptive portion 22 shaped to receive an end of mirror housing 20. For a breakaway mirror assembly, mirror housing 20 may be spring mounted to applique 18 so that if a force is applied to applique 18, mirror housing 20 moves without moving applique 18. For a stationary mirror applique 18 may be rigidly mounted to housing 20 by the use of bolts. Applique 18 may be an integrally formed component with housing 20.

Mirror housing 20 generally defines a cavity 24 sized to receive a mirror 26 mounted on a base plate 27 and a power pack 28. Base plate 27 may be a piece of plastic onto which mirror 26 is mounted. Power pack 28 is fixedly mounted to housing 20 in a conventional manner such as by way of screws (not shown). Commonly, a flange or the like is integrally formed within housing 20 to form a mounting surface. Power pack 28 is connected to the interior of the vehicle through a control line 30. Control line 30 is connected to a switch (not shown) within vehicle 10 to control the operation of power pack 28.

Preferably, mirror 26 is connected to power pack 28 at three places. The first place is a stationary pivot assembly 32. Stationary pivot assembly 32 is a ball and socket type assembly. Pivot assembly 32 has a socket 34 and a ball 36. Socket 34 is preferably connected to mirror 26 or integrally formed on base plate 27. Ball 36 may be mounted to power pack 28 or may be directly mounted onto mirror housing 20. To aid in aligning mirror 26 consistently with power pack 28, ball 36 preferably is mounted to or formed integrally with power pack 28. Ball 36 remains stationary during operation of the mirror.

The other two connections onto which mirror 26 is mounted are movable pivot assemblies 38 and 40. That is, movable pivot assemblies 38 and 40 move with respect to power pack 28. Movable pivot assembly 38 has a socket 42 integrally fixed to mirror 26 and a ball 44 which is movable in the direction shown by arrow 46. Movable pivot assembly 40 also has a socket 48 affixed to mirror 26 (or base plate 27) and a ball 50 mounted with respect to power pack 28. Ball 50 moves in a direction shown by arrow 52 with respect to power pack 28.

Figure 3:
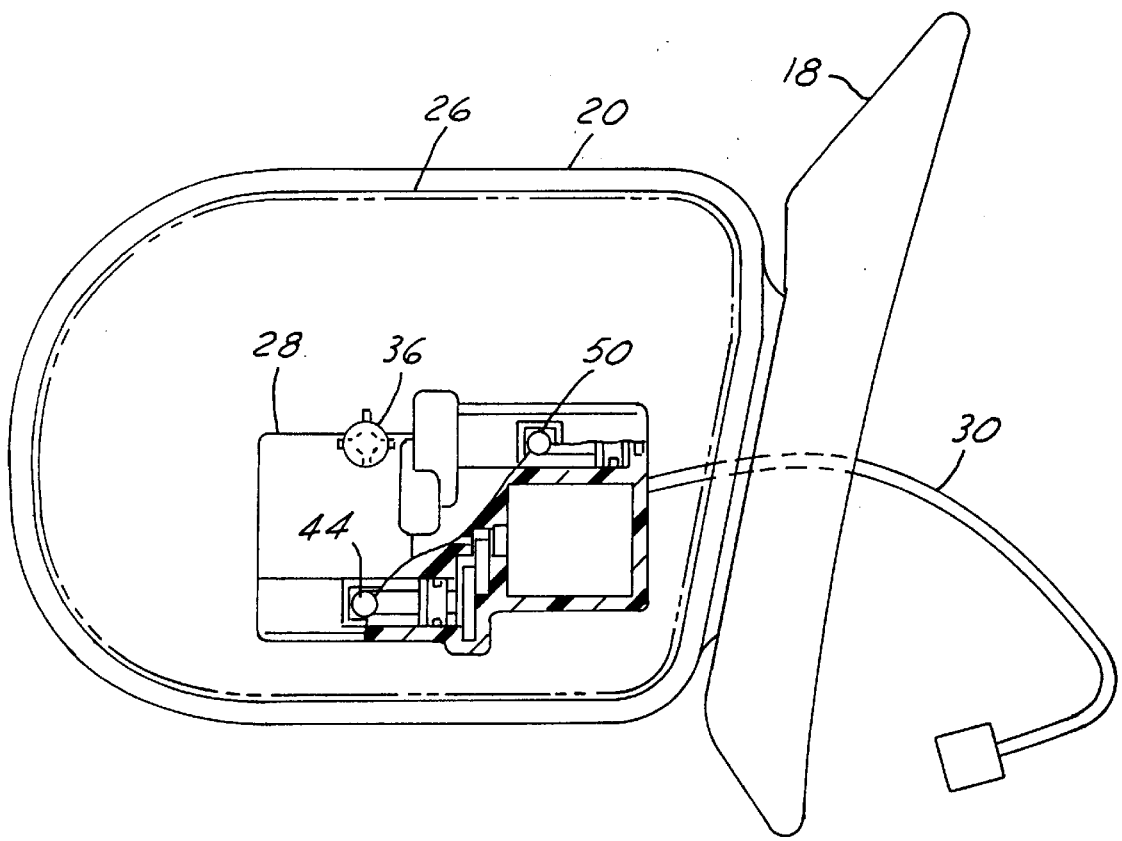
FIG. 3 is a forward-looking view of a mirror assembly illustrating a power pack with respect to the mirror housing.

Referring now to FIG. 3, power pack 28 is shown having ball 50 and ball 44 which are both horizontally and vertically displaced from stationary ball 36. Ball 50 and ball 44 generally form a right angle with stationary ball 36 as the vertex. As ball 50 and ball 44 extend into and out of power pack 28, a full range of movement of mirror 26 is thus available. As shown in the drawings, as ball 50 extends out of the page (out of the power pack 28), the mirror 26 pivots the left portion of the mirror out of the page about the axis of ball 36. Likewise, as ball 44 extends out of the page (out of the power pack 28), the mirror 26 pivots the lower portion of the mirror out of the page about the axis of ball 36. By separately controlling the movement of balls 50 and 44, the degree of movements may be precisely controlled to obtain the mirror 26 position desired by the vehicle operator.

Figure 4:
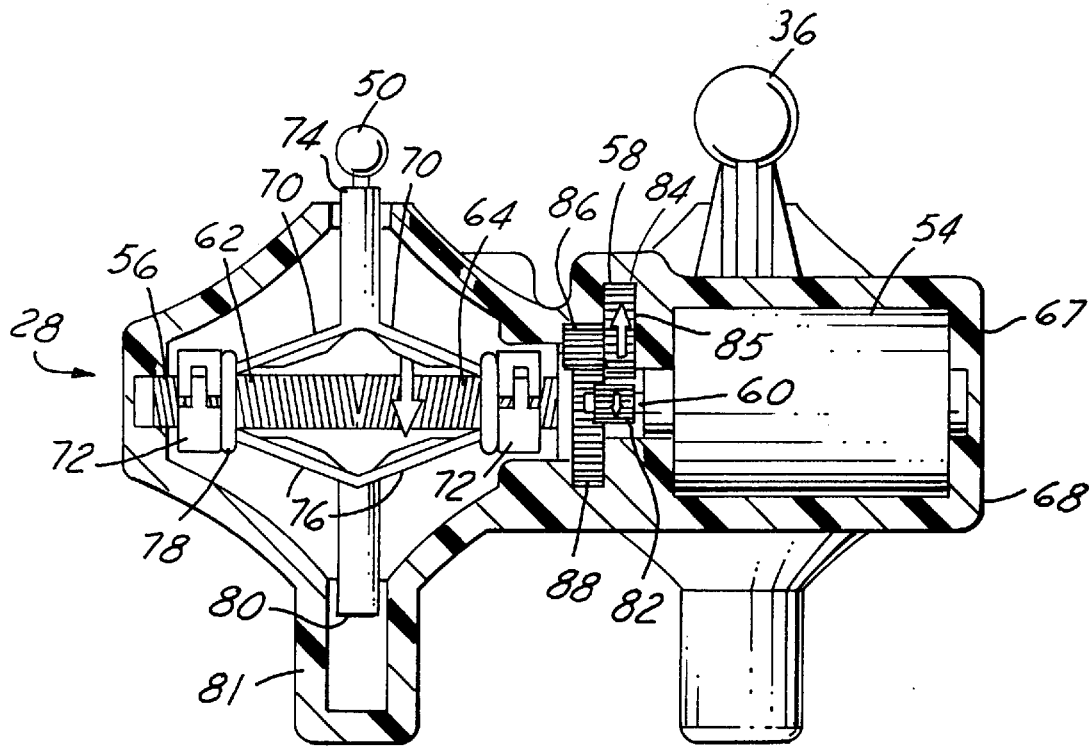
FIG. 4 is a partial breakaway, cross-sectional views of the power pack with the ball retracted.
Figure 4A:
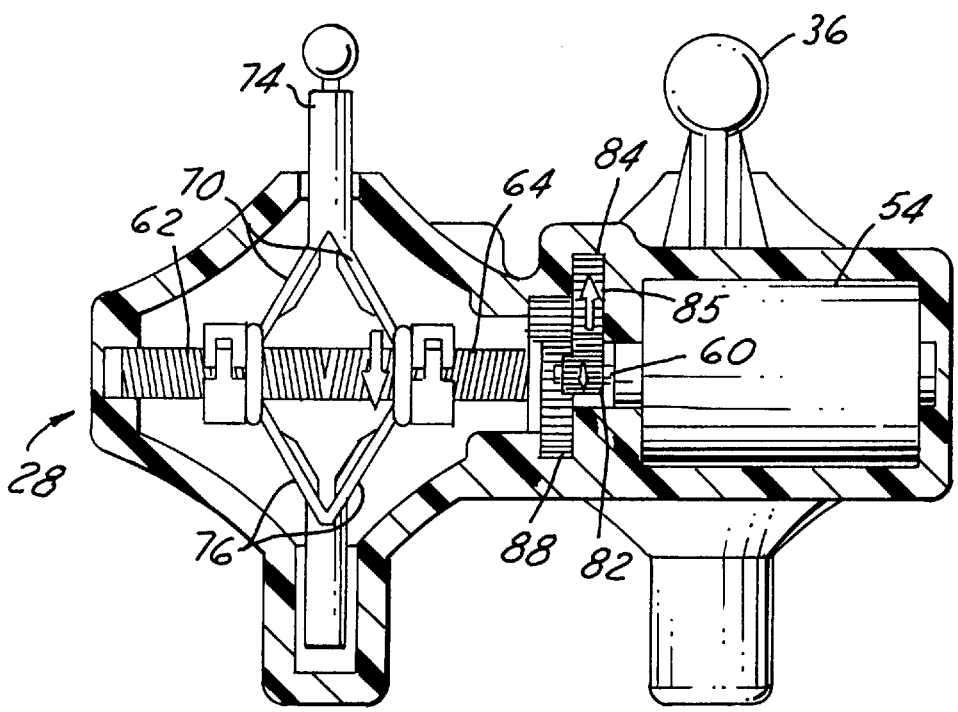
FIG. 4A is a partial breakaway, cross-sectional views of the power pack with the ball extended.

Referring now to FIGS. 4 and 4A, the movement of ball 50 is controlled by a motor 54 which is coupled to a drive shaft 56 through a gear set 58 (described below). Motor 54 has a shaft 60 that is coupled to gear set 58. FIG. 4 shows ball 50 in a retracted position from housing 66. FIG. 4A shows ball in an extended position from housing 66.

Drive shaft 56 has a length which is divided into two sections, the first section 62 is threaded in an opposite direction from that of the second section 64. Motor 54, drive shaft 56 and gear set 58 are preferably all housed within a power pack housing 66. Drive shaft 56 is generally intersecting with a pivot assembly translational axis 51. Power pack housing 66 may be comprised of two portions, an upper half 67 and a lower half 68.

Ball 50 is coupled to drive shaft 56 through one end of a pair of arms 70. Arms 70 are each connected to a ratchet mount 72. Arms 70 may be attached to ball 50 through a connection member 74. The existence of and/or length of connection member 74 depends on the geometry of the desired mirror configuration. If, for example, balls 50 and 44 are located close to ball 36, member 74 may be shorter than if balls 50 and 44 are further from ball 36.

As drive shaft 56 rotates, ratchet mounts 72 move simultaneously in opposite directions along drive shaft 56. That is, ratchet mounts 72 both move toward the center of or away from the center of drive shaft 56. As ratchet mounts 72 reach the end of travel on drive shaft 56, ratchet mount 72 prevents damage to itself or drive shaft 56 by permitting drive shaft 56 to ratchet therethrough without engaging drive shaft 56. That is, ratchet mount 72 allow drive shaft 56 to continue to rotate while ratchet mount 72 remain stationary. This is shown in FIG. 4.

A second pair of arms 76 may also be coupled to ratchet mount 72. Ratchet mount 72 each may have an O-ring 78 through which drive shaft 56 may turn. The second pair of arms 76 are preferably coupled to O-ring 78. A memory sensor 80 may be mounted within a sensor receptacle 81 which is preferably integrally formed within housing 66 of power pack 28. Memory sensor 80 is coupled to the second pair of arms 76. Second pair of arms 76 move simultaneously with the arms 70. Consequently, the position of sensor corresponds to the position of its corresponding ball. Providing a sensor 80 allows the position of balls 44 and 50 to be ascertained and repeated 50 features such as panning outward during lane changes, panning down during parking and repeating standard memory settings for more than one user may be implemented. Sensor 80 provides feedback to a motor controller to allow motor 54 to properly position ball 50 with respect to power pack 28. Sensor pickup 80, for example, is preferably read by a proximity sensor to sense the distance between the bottom of sensor receptacle 81 and sensor pickup 80. One example of a sensor is a hall effect sensor using a metal sensor pickup 80.

Gear set 58 may be comprised of several gears to link to drive shaft 56 to motor 54. In this particular embodiment three gears are used to link output shaft 60 of motor 54 with drive shaft 56. A first gear 82 is fixedly coupled to output shaft 60 to rotate with output shaft 60. A reduction gear 84 has a first set of teeth 85 is operatively coupled to mesh with first gear 82. Reduction gear 84 has a second set of teeth 86 which is operatively coupled to mesh with a drive gear 88. Drive gear 88 is fixedly coupled to output shaft 56. With reference to the arrows in the drawing, as output shaft rotates in a downward motion, reduction gear 84 moves in an upward direction. As a result, drive shaft 56 and drive gear 88 move in the direction shown on drive shaft 56. Reduction gear 84 may be coupled in a conventional manner to power pack housing 66. Using three gears reduces the load on the motor and thus reduces motor noise. Each gear is preferably made of a plastic material and have no parting lines which reduce undesirable noise in operation of the gears.

Figure 5:
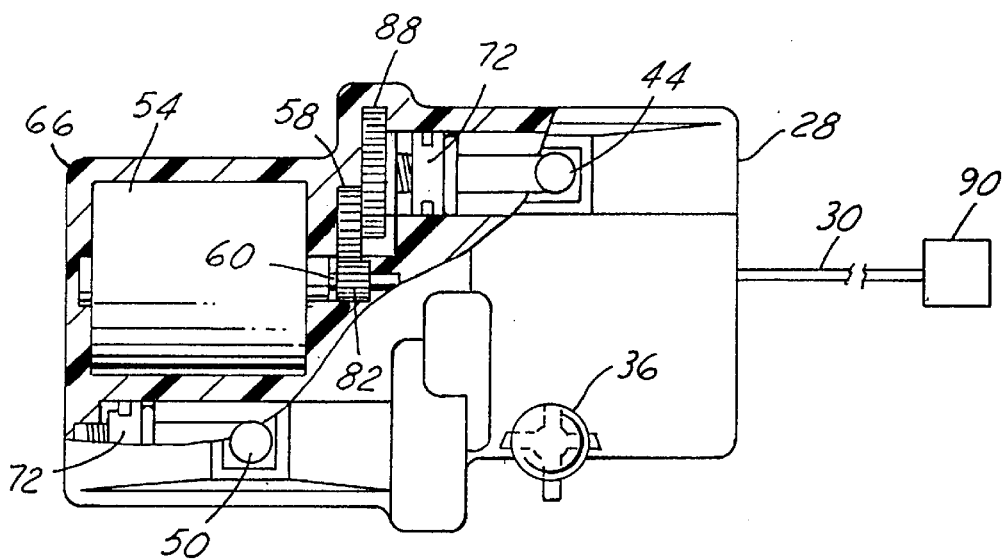
FIG. 5 is an enlarged cross-sectional view of the side of the power pack.

Referring now to FIG. 5, a top view of power pack 28 is shown. The control mechanism for ball 44 is similar to that as shown in FIGS. 4 and 4A. Ball 50 and ball 44 operate in the same manner. Each set of motors 54, gear sets 58 and drive shafts 56 are all preferably housed within power pack housing 66 for installation as a single unit into a mirror housing. Each of the components including power pack housing 66 may be formed from a plastic material except, of course, motor 54. Each of motors 54 are preferably controlled through separate control lines 30 with common ground which are connected to a switch 90 located within passenger compartment of automotive vehicle 10. Switch 90 provides commands to motors 54 so that either one or both of the motors 54 may rotate in a particular direction to effectuate the proper movement desired by the vehicle operator. If movement requires ball 50 to move in a particular direction, motor 54 rotates in the predetermined direction causing arms 70 to move together or apart. Ratchet mounts 72 will then move together or apart on output shaft 60 which has threads in first section 62 opposite that of threads in the second section 64.

During assembly the exact position of ratchet mount 72 on drive shaft 56 is not critical since during the first operation when ratchet mount 72 reaches its furthest open or closed position, ratchet mount 72 will rotate in place on drive shaft while the other ratchet mount 72 moves to its final position. Once this occurs, ratchet mounts 72 will be centered on output shaft 60.

While the best mode for carrying out the present invention has been described in detail, those familiar with the art to which this invention relates will recognize various alternative designs and embodiments for practicing the invention as defined by the following claims:

What is claimed is:

1. A power pack for adjusting a mirror mounted within a mirror housing of an automotive vehicle comprising:

a power pack housing;

a motor affixed within said power pack housing;

a drive shaft rotatably coupled to said motor, said motor rotating said shaft about an axis of rotation;

a movable pivot assembly coupled to said mirror extending from said power pack housing and having an axis of translation generally intersecting with said drive shaft; and a first adjuster connecting said movable pivot assembly to said drive shaft to adjust said movable pivot assembly in a radial direction with respect to said drive shaft.

2. A power pack as recited in claim 1, further comprising a stationary pivot assembly coupled to said power pack housing.

3. A power pack as recited in claim 2, wherein said adjuster pivots said mirror about said stationary pivot assembly.

4. A power pack as recited in claim 2, further comprising a second motor coupled within said power pack housing;

a second drive shaft member rotatably coupled to said second motor, said second motor rotating said shaft about a second axis of rotation;

a second movable pivot assembly coupled to said mirror extending from said power pack housing; and a second adjuster connecting said second movable pivot assembly to said second drive shaft to adjust said second movable pivot assembly in a radial direction with respect to said second drive shaft.

5. A power pack as recited in claim 1, wherein said drive shaft has a length, said length divided into a first portion and a second portion, said first portion having a first set of threads, said second portion having a second set of threads opposite in direction to said first set of threads.

6. A power pack as recited in claim 5, wherein said adjuster comprises a first arm having a first end for coupling to said first portion of said shaft and a second end for coupling to said movable pivot assembly, and a second arm having a first end for coupling to said second length portion of said shaft and a second end for coupling to said second movable pivot assembly.

7. A power pack as recited in claim 6, further comprising a sensor pickup operatively coupled to said drive shaft, said sensor pickup being received within a sensor pickup receptacle coupled within said power pack housing, said sensor pickup sensing the distance between said sensor receptacle bottom and said sensor pickup.

8. A power pack as recited in claim 7, wherein said sensor pickup is operatively coupled to said drive shaft by a third arm having a first end for coupling to said first length portion of said shaft and a second end for coupling to said sensor and a fourth arm having a first end for coupling to said second length portion of said shaft and a second end for coupling to said sensor pickup.

9. A power pack as recited in claim 8, wherein said third and fourth arms are coupled to said first and second arms, respectively.

10. A power pack as recited in claim 6, wherein said first end of said first shaft and said second end of said second shaft have a ratchet connected thereto.

11. A power pack as recited in claim 10, further comprising gear means for coupling said drive shaft to said motor.

12. A power pack as recited in claim 11, wherein said motor having an output shaft, said gear means comprising a first gear fixedly coupled to said drive shaft, a second gear fixedly coupled to said output shaft and a reduction gear coupling said first gear to said second gear.

13. A method for controlling a mirror within a housing comprising the steps of:

rotating a drive shaft within a power pack housing;

coupling a mirror to a moveable pivot assembly;

coupling said drive shaft to said movable pivot assembly;

moving said pivot assembly in a radial direction with respect to said drive shaft along a translational axis generally intersecting with said drive shaft; and pivoting said mirror about a stationary pivot point.

14. A method for controlling a mirror as recited in claim 13, wherein said step of rotating said drive shaft comprises the sub-steps of:

rotating an output shaft of a motor having a first gear coupled thereto;

rotating a reduction gear; and rotating a second gear fixedly coupled to said drive shaft.

15. A method for controlling a mirror as recited in claim 13, wherein said step of moving said pivot assembly comprises the sub-steps of:

moving a first arm coupled between said drive shaft in a first axial direction with respect to said shaft; and moving a second arm coupled between said drive shaft in a second axial direction with respect to said drive shaft, said second axial direction opposite said second axial direction.

16. A method for controlling a mirror as recited in claim 13, further comprising the steps of ratcheting said first arm and said second arm on said drive shaft.

17. A method for controlling a mirror as recited in claim 13, further comprising the steps of;

rotating a second drive shaft;

coupling a mirror to a second pivot assembly;

moving said second pivot assembly in a radial direction to said shaft; and pivoting said mirror about a pivot point.

* * * * *